United States Patent [19]

Wada

[11] 3,839,661
[45] Oct. 1, 1974

[54] COMMUTATORLESS DIRECT CURRENT MOTOR

[75] Inventor: Kinzo Wada, Yokohama, Japan

[73] Assignee: Victor Company of Japan, Ltd., Yokohama, Kanagawa-ken, Japan

[22] Filed: Feb. 23, 1973

[21] Appl. No.: 335,159

[30] Foreign Application Priority Data
Feb. 26, 1972 Japan.................. 47-19914

[52] U.S. Cl. ............................. 318/138, 318/254
[51] Int. Cl. ........................................ H02k 29/00
[58] Field of Search................. 318/138, 171, 254

[56] References Cited
UNITED STATES PATENTS

| | | | |
|---|---|---|---|
| 3,383,574 | 5/1968 | Manteuffel.................. | 318/254 X |
| 3,465,224 | 9/1969 | Takeyasu..................... | 318/254 X |
| 3,518,517 | 6/1970 | Rainer......................... | 318/254 |
| 3,541,408 | 11/1970 | Schwendtner et al. ...... | 318/254 X |
| 3,716,769 | 2/1973 | Brunner....................... | 318/254 |

*Primary Examiner*—G. Z. Rubinson
*Attorney, Agent, or Firm*—Holman & Stern

[57] ABSTRACT

A commutatorless direct current (DC) motor comprises, essentially, a rotor comprising a permanent magnet magnetized to have a sinusoidal distribution of magnetic flux density in the circumferential direction about the rotor axis and a circuit operating in accordance with voltages led out from voltage terminals of Hall elements provided to confront the rotor to cause currents of half sinusoidal waveform to flow through stator coils. This circuit is adapted further to pass currents of rectangular waveform through the stator coils at the time of starting of the rotor and to pass sinusoidal-waveform currents therethrough at the time of high-speed rotation of the rotor.

4 Claims, 16 Drawing Figures

COMMUTATORLESS DIRECT CURRENT MOTOR

BACKGROUND OF THE INVENTION

This invention relates generally to a commutatorless direct current (DC) motor and more particularly to a commutatorless DC motor in which currents controlled by the output voltages of Hall elements are caused to flow through stator coils.

In a known commutatorless DC motor wherein Hall elements are used, currents of rectangular waveform with mutually staggered phase are caused to flow successively through respective stator coils in a discontinuous manner thereby to form a rotating magnetic field and cause the rotor to rotate. This continual passing of rectangular-waveform currents through the stator coils gives rise to variations in the rotational torque as described hereinafter, whereby vibration is generated at the time of rotation of the rotor.

As possible measures for overcoming this difficulty, the use of a rotor of very large moment of inertia and the use of a rotor of a large number of slots, for example, are conceivable. These measures, however, require much material and necessitate a starting torque which is remarkably greater than the steady state rotational torque since the starting time is held at a constant value. Consequently, the motor construction becomes complicated and gives rise to drawbacks such as high cost.

SUMMARY OF THE INVENTION

Accordingly, it is a general object of the present invention to provide a new and useful commutatorless DC motor wherein Hall elements are used, and in which the above described difficulties are overcome.

More specifically, an object of the invention is to provide a commutatorless DC motor wherein currents of half sinusoidal waveform are caused to flow through stator coils. In the DC motor according to the present invention, the rotor undergoes smooth rotation continually with constant torque and without rotational fluctuations.

Another object of the invention is to provide a commutatorless DC motor wherein currents of rectangular waveform are passed through the stator coils at the time of starting of rotation of the motor, and currents of sinusoidal waveform are passed through the stator coils at the time of high-speed rotation of the rotor. By this feature, starting is accomplished with a large torque, and during constant-speed rotation, the rotor rotates smoothly with a constant torque.

Still another object of the invention is to provide a commutatorless DC motor having a driving circuit operating to correct differences in the product sensitivities and the like of a plurality of Hall elements and to pass currents having unevenness in magnitude through the stator coils.

Other objects and further features of the invention will be apparent from the following detailed description when read in conjunction with the accompanying drawings, throughout which like parts are designated by like reference numerals and characters.

DETAILED DESCRIPTION

In a known commutatorless DC motor in which Hall elements are used, switching transistors are operated by voltages of rectangular waveform of the outputs of the Hall elements and rectangular waveform currents obtained by this switching operation are passed through the stator coils.

Figure 1:
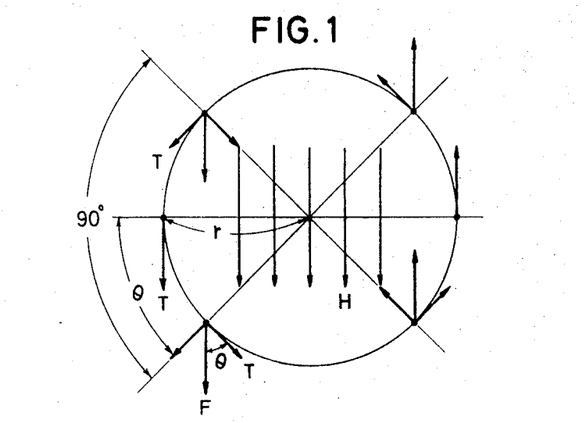
FIG. 1 is a diagram for a description of forces generated between magnetic fields formed by stator coils and the rotor of a DC motor.
Figure 2:
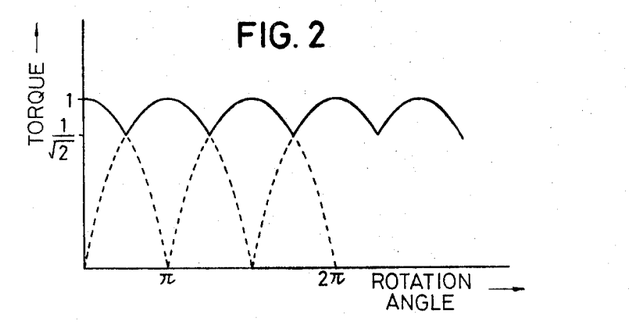
FIG. 2 is a graphical representation indicating the torque generated in a commutatorless DC motor of known type.

Then, when the magnetic field generated by the stator current of this rectangular waveform is made to assume a uniform distribution, the force F produced between this magnetic field H and the magnetic pole (of a strength $m$) of the rotor is equal to $mH$. Therefore, the torque $T$ varies with the rotational position of the rotor as indicated in FIG. 1 and can be expressed by $T = 2\,rmH \cos \theta$, where $r$ is the radius of the rotor, and $\theta$ is the rotational angle of the rotor.

As a result, the torque produced in this conventional motor pulsates within a range of from 1 to $1/\sqrt{2}$, whereby a vibration is generated at the time of rotation. Accordingly, the present invention contemplates the provision of a commutatorless DC motor wherein a constant output torque without pulsation or fluctuation can be obtained, as described hereinafter with respect to preferred embodiment of the invention as illustrated in FIG. 3 and the following figures.

Figure 3:
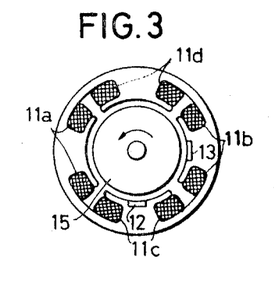
FIG. 3 is an end view of one embodiment of a commutatorless DC motor according to the invention.
Figure 4:
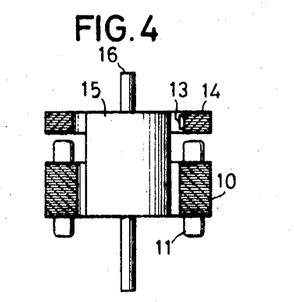
FIG. 4 is a side view, partly in longitudinal section, of the motor shown in FIG. 3.

In a first embodiment of a commutatorless DC motor according to the invention as illustrated in FIGS. 3 and 4 in end view and side view in longitudinal section, respectively, there is provided a stationary iron core 10 wound with a stator coil 11. Hall elements 12 and 13 are disposed and fixed with a spacing in terms of electrical angle of 90° on a yoke 14 for forming a magnetic circuit for these Hall elements. The stator coil 11 is constituted by four coils 11a, 11b, 11c and 11d disposed with spacing intervals of 90° in terms of electrical angle. Since the motor of this embodiment is a two-pole, commutatorless DC motor, the above mentioned electrical angle of 90° is equal to a mechanical angle of 90°.

The rotor 15 is constituted by a permanent magnet and is formed in a cylindrical shape at least in its part for imparting a magnetic field to the Hall elements 12 and 13. The rotor 15 has a sinusoidal distribution of magnetic flux density in its circumferential direction. The rotor 15 is coaxially mounted on and rotates integrally with a rotor shaft 16.

In one specific embodiment of the rotor 15 in the case it is of the outer-rotor type, ten magnet units (i.e., 20 poles), each cut obliquely relative to the axial direction of the rotor, are unitarily aligned in a ring shape with alternate N and S poles disposed adjacently, thereby to establish a strength distribution of sinusoidal waveform of the magnetic flux density in the rotor circumferential direction.

Figure 5:
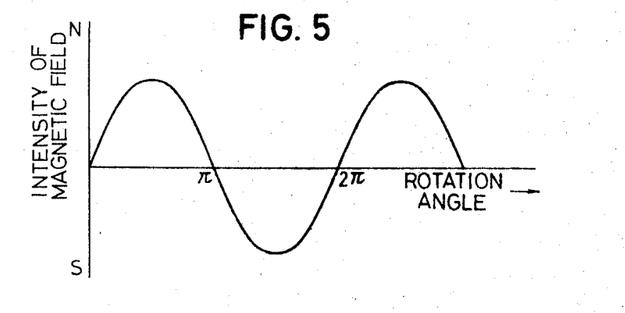
FIG. 5 is a graphical representation indicating the variation in magnetic flux density distribution with rotational angle of the rotor of the motor shown in FIG. 3.

Accordingly, as the rotor 15 rotates, the Hall elements 12 and 13 respectively receive a magnetic force of a magnetic field which varies sinusoidally as indicated in FIG. 5. Consequently, the Hall elements 12 and 13 generate sinusoidal voltages at their voltage terminals in proportion to this variation in the magnetic force.

Figure 6:
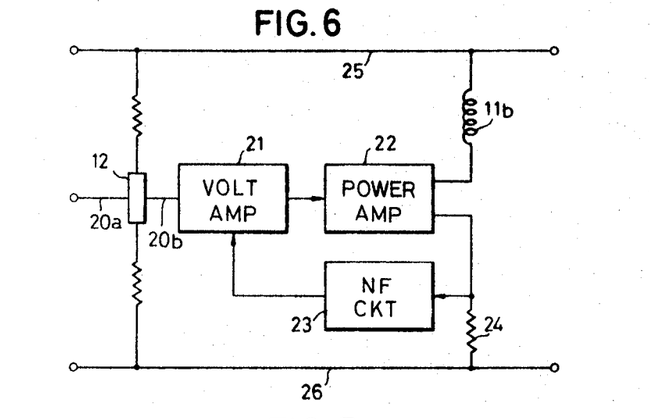
FIG. 6 is a schematic diagram indicating the essential parts of one embodiment of a driving circuit of a commutatorless DC motor according to the invention.

A circuit part of the Hall element 12, the stator coil 11b, and parts related thereto within one embodiment of a driving circuit of a motor according to the invention is shown in FIG. 6. A voltage produced at a voltage terminal 20b of the Hall element 12 is amplified by a voltage amplifier 21 and is further amplified by a power amplifier 22. The current flowing through the stator coil 11b is controlled by the output of the power amplifier 22. The stator coil 11b is connected between a power supply line 25 and the power amplifier 22.

Furthermore, the output side of the power amplifier 22 is connected to the input side of the voltage amplifier 21 by way of negative feedback circuit 23. In addition, a resistor 24 is connected between the output side of the power amplifier 22, that is, the input side of the negative feedback circuit 23, and an earth (ground) line 26. The current flowing through the stator coil 11b flows through this resistor 24. Consequently, a voltage proportional to this current is produced across the both ends of the resistor 24 and is negative-fed back by way of the negative feedback circuit 23 to the voltage amplifier 21. Thus, the voltage amplifier 21, the power amplifier 22, and the negative feedback circuit 23 constitute a negative feedback amplifier. The voltage amplifier 21 and the power amplifier 22 can thereby accomplish amplification faithfully without causing distortion of the input waveform.

Figure 7:
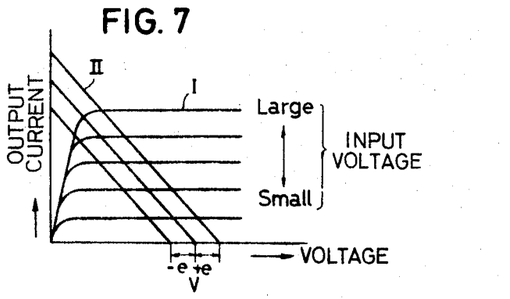
FIG. 7 is a graphical representation indicating the voltage-output current characteristics of the driving circuit shown in FIG. 6.
Figure 8:
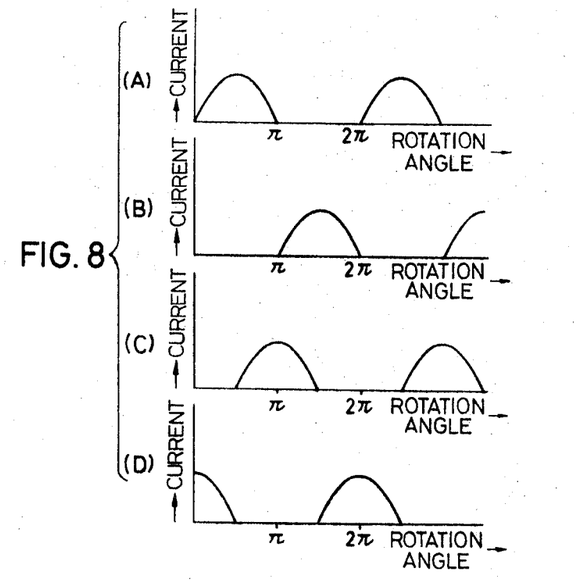
FIGS. 8A through 8D are respectively current waveform diagrams indicating currents of half sinusoidal waveform flowing through the motor stator coils.

A counter electromotive force ($\pm e$) is generated in the stator coil 11b and is superimposed on the power-supply voltage V. However, if the output current versus voltage characteristics of the power amplifier 22 are as represented by the curves in FIG. 7, the output current, i.e., the current flowing through the stator coil 11b, is proportional to only a half wave of the input voltage, i.e., the sinusoidal output voltage of the Hall element 12. These relationships are similarly valid in the other stator coils and Hall element. In FIG. 7, curves I are depicted with parameters of the input voltages and straight lines II show the load lines.

Thus, currents of half sinusoidal waveforms as indicated in FIGS. 8A through 8D flow through the stator coils 11a, 11b, 11c and 11d. These currents are staggered in phase by $\pi/2$ as indicated in FIGS. 8A through 8D. These currents generate a revolving magnetic field whereby the rotor 15 rotates in the counterclockwise direction as viewed in FIG. 3.

Figure 9:
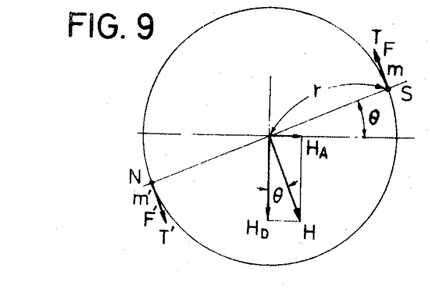
FIG. 9 is a diagram for a description of the torque generated in a commutatorless DC motor of the invention.

When the rotor 15 is at an angular position of an angle $\theta$ within a range of from 0 to $\pi/2$ as indicated in FIG. 9, currents flow through the stator coils 11a and 11d to generate magnetic fields Ha and Hd, which can be expressed by $Ha = k \cdot Im \sin \theta$ and $Hd = k \cdot Im \cos \theta$, where $k$ is a constant of proportionality. Accordingly, the resultant magnetic field H can be expressed by $|H| = \sqrt{Ha^2 + Hd^2} = k \cdot Im$, and the angle $\theta$ becomes unrelated. The direction of this resultant magnetic field $H$ is always perpendicular to the direction of the magnetic poles NS of the rotor 15.

Therefore, the forces $F$ and $F'$ produced between this magnetic field $H$ and the magnetic poles $m$ and $m'$ of the rotor 15 become $F = mH$ and $F = m'H$, and the torque T becomes $T = rmH + rm'H = 2rmH$ and becomes unrelated to the rotational angle $\theta$.

Next, when the rotor 15 enters the range of from $\pi/2$ to $\pi$, the current through the stator coil 11a passes its peak and begins to decrease, and a current begins to flow through the stator coil 11c which now takes over from the stator coil 11d. In this case, also, the resultant rotating field $H$ is sustained at a constant value continuously from the above described operational stage and, at the same time, continues rotating in its perpendicular state relative to the direction of the magnetic poles NS of the rotor 15. Thereafter, the above described operational state is successively maintained over all angles of one revolution of the rotor 15, and rotation is accomplished in a smooth manner with constant torque and without pulsation or fluctuation.

While the invention has been described above with respect to the first embodiment in which the motor is of a 2-pole, 4-coil, inner-rotor type, the motor may be of a multiple-pole, multiple-coil type and may be of an outer-rotor type.

Then, in order to cause the motor to assume a steady rotational state with a specified short time, a large starting torque is necessary, and it is also necessary that response of the speed control circuit is amply good. Furthermore, in order to attain a smooth, steady rotational state, the driving currents supplied to all of the stator coils must be in a balanced state, that is, a state wherein their flow angles are respectively 180°, and, at the same time, their respective amplitudes are equal.

However, in the case where currents of half sinusoidal waveform (hereinafter referred to simply as "sinusoidal waveform") are used for the driving currents passed through the stator coils, a starting torque equal to that in the case where currents of rectangular waveform are used cannot be obtained unless the crest or peak values (amplitudes) of the driving currents are made higher than those in the case where currents of rectangular waveform are used. For this reason, it is considered that in the case where the starting time is held to a constant value, the power amplifier for amplifying driving currents of sinusoidal waveform to be used, that is, a power amplifier having an operating point within an active region between a saturation region and a cut-off region, must have a large power capacity.

Accordingly, in order to solve this problem, a starting current of rectangular waveform should be supplied to the stator windings at the time of starting operation, and a driving current of sinusoidal waveform should be supplied to the stator coils at the time of constant rotation.

A specific embodiment of a DC motor according to this invention fulfilling the above mentioned requirements will now be described with reference to FIG. 10.

Figure 10:
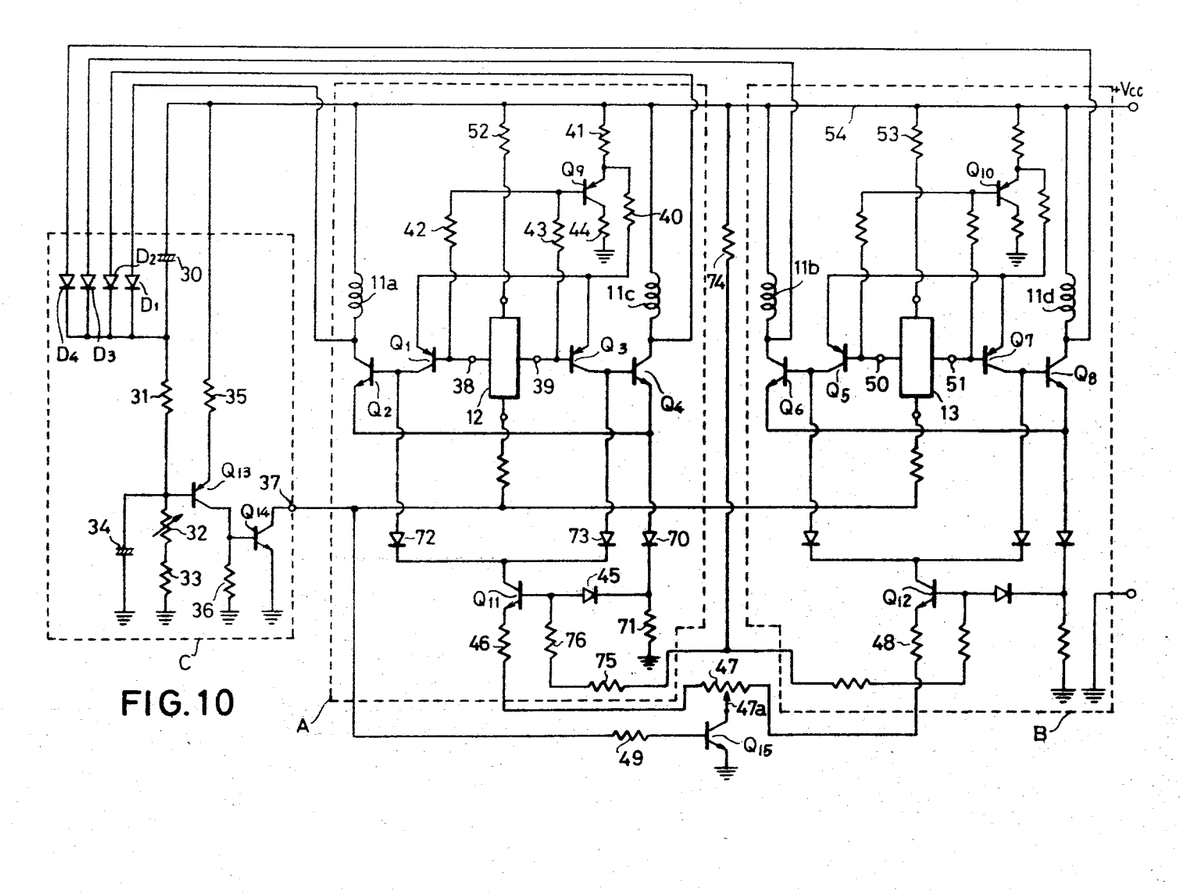
FIG. 10 is a circuit diagram indicating a specific embodiment of a driving circuit of a commutatorless DC motor of the invention.

In the circuit group shown in FIG. 10, a block A shown as an enclosure obtained by a single-dot chain line represents a circuit for supplying driving currents to stator coils 11a and 11c through the use of components such as a Hall element 12 and transistors Q1 through Q4, Q9 and Q11. Block B represents a circuit for supplying driving currents to stator coils 11b and 11d through the use of components such as a Hall element 13 and transistors Q5 through Q8, Q10 and Q12. Since the circuit organizations and operations of the blocks A and B are identical, the following description is set forth with respect to only the block A, and description of the block B will be omitted.

In addition, a block C shown as still another enclosure outlined by a single-dot chain line in FIG. 10 represents a speed-control circuit comprising circuit components such as diodes D1 through D4 each connected to one end of a respective one of the coils 11a through 11d, capacitors 30 and 34, and transistors Q13 and Q14. In this speed-control circuit C, a counter electromotive force generated with a magnitude proportional to the rotational speed of the rotor in the stator coils 11a through 11d as the rotor rotates is led out of the circuit of the diodes D1 through D4 and the capacitor 30. This counter electromotive force is applied by a circuit of a resistor 31, a variable resistor 32, and a resistor 33 to the base of the transistor Q13 so as to control the circuit of the transistor Q13. A smoothing capacitor 34 is connected in parallel with the variable resistor 32 and the resistor 33.

A current flowing through the circuit of a resistor 35, the emitter and collector of the transistor Q13, and a resistor 36 varies with the rotational speed of the rotor. When the rotation speed of the rotor is low, a large voltage drop is produced across the resistor 36, and when the rotor speed is high, a small voltage drop is produced across this resistor 36. Accordingly, the collector current of the transistor Q14 is of a large value when the rotor speed is low and is of a small value when the rotor speed is high. Furthermore, the voltage at a terminal 37 connected to the collector of the transistor Q14 becomes low when the rotor speed is low and becomes high when the rotor speed is high.

In the aforementioned block A, the voltage terminals 38 and 39 of the Hall element 12 are respectively connected to the bases of the transistors Q1 and Q3 of a transistor amplification circuit constituting a preamplifier. The collectors of the transistors Q1 and Q3 are respectively connected to the bases of the transistors Q2 and Q4 of a transistor amplification circuit constituting a main amplifier. The collectors of the transistors Q2 and Q4 are respectively connected to the stator windings 11a and 11c, while the emitters of the transistors Q2 and Q4 are commonly connected and further grounded (earthed) by way of a diode 70 for level shifting and an emitter resistor 71.

The transistors Q1 and Q3 of which emitters are connected by way of resistors 40 and 41 to a power supply, operate as a differential amplifier. Between the bases and the emitters of these transistors Q1 and Q3, the transistor Q9 is connected. The middle point potential of the two voltage terminals 38 and 39 of the Hall element 12 is derived by means of resistors 42 and 43 of equal resistance value connected respectively to the voltage terminals 38 and 39. The potential thus obtained is supplied to the emitters of the transistors Q1 and Q3 by way of the transistor Q9, the collector of which is grounded through a resistor 44. By the above described circuit organization, the bias voltages between the bases and emitters of the transistors Q1 and Q3 are continually maintained correctly even when there are variations in resistance value due to temperature changes and deviations in the resistance value of the resistor between the current terminals of the Hall element 12.

To the bases of the transistors Q2 and Q4, the anode sides of the diodes 72 and 73 are respectively connected, while the cathode side of these diodes 72 and 73 are connected to the collector of the transistor Q11. A base-bias setting circuit comprising resistors 42, 43 and 44 is connected to the base of the transistor Q11. Furthermore, the base of the transistor Q11 is connected by way of a diode 45 for level shifting to the junction between a diode 70 and a resistor 71. The emitter of the transistor Q11, moreover, is connected through a resistor 46 to one terminal of a variable resistor 47, the other terminal of which is connected to an emitter resistor 48 of the transistor Q12 of the block B.

The movable, selector contact 47a of the variable resistance 47 is connected to the collector of a transistor Q15 having a switching operation. The base of this transistor Q15 is connected by way of a resistor 49 for current limiting to the output terminal 37 of the speed-control circuit C. For this reason, the potential of the terminal 37 becomes a specific potential, and when the transistors Q15 assumes the conductive state, the movable contact 47a of the variable resistor 47 assumes a grounded state.

Accordingly, when the transistor Q15 is conductive, the circuit of the transistor Q11 exists as a negative feedback path of the transistors Q2 and Q4. When the transistor Q15 becomes nonconductive, the circuit of the transistor Q11 is cut out from the negative feedback path of the transistors Q2 and Q4.

As mentioned hereinbefore, the rotor is magnetized in a manner such that magnetic flux density has a sinusoidal strength distribution in the circumferential direction. Consequently, as the rotor rotates, a voltage of sinusoidal waveform $A \sin \omega t$ is produced at the voltage terminals 38 and 39 of the Hall elements 12 and 13. Then, the difference of the voltages $V_1$ and $V_2$ between the voltage terminals 38 and 39 and ground, respectively, can be expressed as follows.

$$V_2 - V_1 = A \sin \omega t \quad (1)$$

The DC component $E_1$ of the voltages $V_1$ and $V_2$ can be expressed as follows.

$$(V_2 + V_1)/2 = E_1 \quad (2)$$

That is, $E_1$ is the arithmetic mean of $V_2$ and $V_1$. From the above Equations (1) and (2), the following equations are obtained.

$$V_1 = E_1 - \tfrac{1}{2} A \sin \omega t,$$

$$V_2 = E_1 - \tfrac{1}{2} A \sin (\omega t + \pi)$$

On the other hand, $E_1$ can be expressed also as follows.

$$E_1 = Vcc - (R_{52} + \tfrac{1}{2} R_{12}) i_{12},$$

where:

$R_{52}$ is the resistance value of the resistor 52;

$R_{12}$ is the resistance value between the current terminals of the Hall element 12; and $i_{12}$ is the current flowing through the current terminal of the Hall element 12.

The voltages between the bases and emitters respectively of the transistors Q9, Q1, and Q3 will be denoted by $V_{BE9}$, $V_{BE1}$, and $V_{BE3}$. Then, the base voltage of the transistor Q9 is $E_1$, and the emitter voltage thereof will be $(E_1 + V_{BE9})$. Here, the transistors Q1 and Q3 operate as differential amplifiers, and moreover, the alternating-current components of the voltages $V_1$ and $V_2$ are of inverse polarities. For this reason, the current flows almost completely through only one of the transistors Q1 and Q3. This current $i_{40}$ can be expressed as follows.

$$i_{40} \approx (E_1 + V_{BE9}) - (V_1 + V_{BE1})/R_{40},$$

or $$i_{40} \approx (E_1 + V_{BE9}) - (V_2 + V_{BE3})/R_{40},$$

where $R_{40}$ is the resistance value of the resistor 40.

Then, if it is assumed that $V_1 < V_2$, the transistor Q3 will be almost cut off, and the current $i_{40}$ will become as follows.

$$i_{40} \approx (E_1 + V_{BE9}) - (E_1 - \tfrac{1}{2} A\sin\omega t + V_{BE1})/R_{40} = (\tfrac{1}{2} A\sin\omega t)/R_{40} + (V_{Be9} - V_{BE1})/R_{40}$$

Then, if the operating point of the transistor Q9 is so selected that $V_{BE9} - V_{BE1} \approx 0$, the above equation becomes $$i_{40} \approx \tfrac{1}{2} A\sin\omega t/R_{40}$$

That is, the current $i_{40}$ becomes independent of the voltage $E_1$. At this time, therefore, a current proportional to the output of the Hall element 12 will flow through the resistor 40.

Accordingly, it is possible to cause a current proportional to the Hall electromotive force to flow through the transistors Q1 and Q3 even when there is a variation in the control current (e.g., $i_{12}$) for causing the motor to rotate at constant speed due to the difference in the product sensitivity of the Hall element, or when a resistance value of the resistor (e.g., $R_{12}$) between the current terminals of the Hall element is not constant, and the voltage $E_1$ changes.

Figure 14:
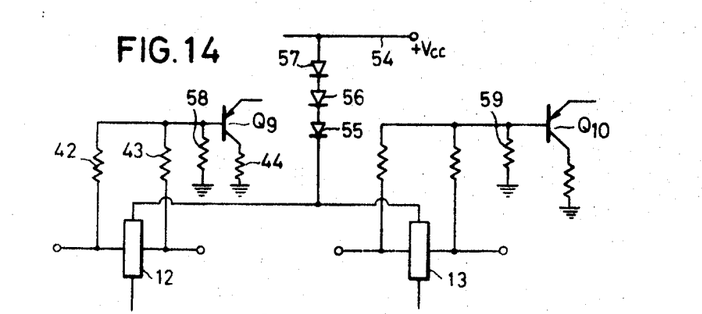
FIG. 14 is a circuit diagram indicating an example of modification of one part of the circuit illustrated in FIG. 10.

The essential parts and organization of an embodiment of a circuit for positively attaining the above described condition $V_{BE9} - V_{BE1} \approx 0$ are shown in FIG. 14. In this embodiment, the circuit is so designed that the variations in the direct-current component $E_1$ of the voltage such as $V_1$ or $V_2$ will be reduced, and, as a result, the emitter current and the voltage $V_{BE9}$ of the transistor Q9 will be reduced. In the circuit illustrated in FIG. 10, the variation in the voltage $V_{BE1}$ is small, and the voltage $E_1$ unavoidably varies because of the variations such as unevenness of the internal resistance and product sensitivity of the Hall element and variation in the ambient temperature.

Accordingly, in the circuit of the instant embodiment shown in FIG. 14, instead of using the resistors 52 and 53 shown in FIG. 10, the current terminals of the Hall elements 12 and 13 on one side thereof are commonly connected, and between the common junction thereof and the power supply line 54, diodes 55, 56 and 57 are inserted in series.

Further, since $|V_{BE9}| > |V_{BE1}|$ in actual operation, resistors 58 and 59 are respectively connected between the bases of the transistors Q9 and Q10 and ground, and the base potentials are lowered. As a result, $V_{BE9} - V_{BE1} \approx 0$. That is, the condition of $i_{40} \approx \tfrac{1}{2}A \sin \omega t/R_{40}$ is positively satisfied. By varying the values of the resistors 58 and 59, the flow angle of the current $i_{40}$ can be suitably adjusted.

Another important characteristic feature of the circuit shown in FIG. 10 will now be described.

Figure 11:
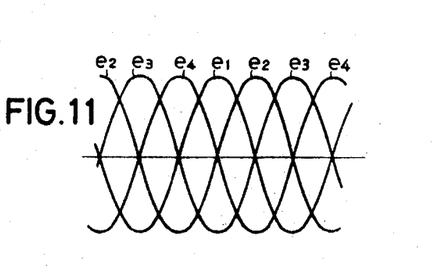
FIG. 11 is a waveform diagram indicating the waveforms of Hall electromotive forces produced at voltage terminals of a Hall element.

In this circuit, the control current supplied to the current terminals of the Hall element 12 varies in accordance with the operation of the speed-control circuit C. The amplitude of the Hall electromotive force (as indicated in FIG. 11) of sinusoidal waveform (full wave) produced at the voltage terminals 38 and 39 of the Hall element varies inversely with the rotational speed of the rotor. That is, the amplitude increases with decreasing rotor speed and decreases with increasing rotor speed. The Hall electromotive forces led out successively from the four voltage terminals 38, 50, 39 and 51 of the Hall elements 12 and 13 are voltages of sinusoidal waveform having phase differences of 90 degrees in successively staggered relationship as indicated by $e1$, $e2$, $e3$ and $e4$ in FIG. 11.

On the other hand, the potential of the terminal 37 of the speed-control circuit C decreases with decreasing rotational speed of the rotor as mentioned above. For this reason, when the rotor speed is low, as at the time of starting of the motor, the transistor Q15 assumes a cut-off state, and the movable contact of the variable resistor 47 is no longer grounded. Consequently, the transistor Q11 becomes inoperative, and the negative feedback path is removed from the amplification circuit of the transistors Q2 and Q4, whereby the amplification degrees of these transistors Q2 and Q4 rise.

Figure 12:
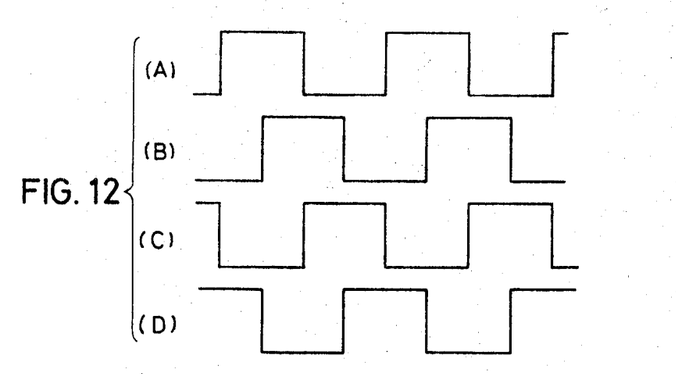
FIGS. 12A through 12D are respectively waveform diagrams indicating the waveforms of currents flowing through the stator coils during starting and low-speed rotation of the rotor of the motor.

In this state of the circuit, Hall electromotive forces of large amplitudes and mutually opposite phase are being imparted from the voltage terminals 38 and 39 of the Hall element 12 to the bases of the transistors Q1 and Q3. For this reason, the amplification circuit of the transistors Q1 and Q3 performs its amplification operation in a saturated state, a driving current of rectangular waveform is supplied with a flow angle of substantially 180 degrees from this amplification circuit to the transistors Q2 and Q4, which carry out switching. Consequently, currents of rectangular waveforms as indicated in FIGS. 12A and 12C flow through the stator coils 11a and 11c. Similarly, currents of rectangular waveforms as indicated in FIGS. 12B and 12D flow through the stator coils 11b and 11d. Therefore, at the time of starting of the motor, rectangular-waveform currents flow through all stator coils, and the rotor rotation is started with a large torque.

Then, as the rotor speed increases, and the motor reaches its constant rotation state, the control current supplied from the speed-control circuit C to the current terminals of the Hall element 12 becomes small. Hall electromotive forces of sinusoidal waveforms which have relatively small amplitudes and a mutually inverse phase relationship appear at the voltage terminals 38 and 39 of the Hall element 12 and are thus supplied to the bases of the transistors Q1 and Q3. The level of the Hall voltage of sinusoidal waveform supplied from the voltage terminals 38 and 39 of the Hall element 12 to the bases of the transistors Q1 and Q3 is selected at a value which is sufficiently high so that effects such as variations in the unbalanced voltage of the Hall element, variations in the voltages between the emitters and bases of the transistors Q1 and Q2, and a ripple component in the control current are negligible.

On the other hand, the potential of the terminal 37 of the speed-control circuit C is caused to be a positive potential of ample magnitude when the rotor is in a state of high-speed rotation. Accordingly, the transistor Q15 assumes its conductive state, and consequently the transistor Q11 is placed in its operative state and is thereby inserted as a negative feedback circuit into the amplfication circuit of the transistors Q2 and Q4. The amplification circuit of the transistors Q2 and Q4 operates as a negative feedback amplifier of little distortion and low gain.

Furthermore, in the differential amplifier comprising the transistors Q1 and Q3, the Hall electromotive force of sinusoidal waveform applied to the bases of these transistors Q1 and Q3 has a small amplitude which is not sufficient for causing the amplification circuit of the transistors Q1 and Q3 to operate as a differential amplifier.

Figure 13:
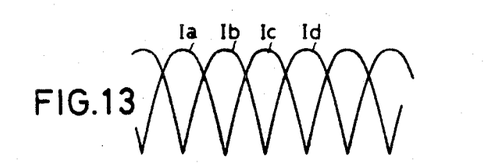
FIG. 13 is a waveform diagram indicating the waveforms of current flowing through the stator coils during high-speed rotation and constant-speed rotation of the rotor.

Accordingly, while the rotor is rotating in a constant rotation, driving currents of half sinusoidal waveform having a mutual phase difference of 180° as indicated by curves Ia and Ic in FIG. 13 flow respectively through the stator coils 11a and 11c. Similarly, driving currents of half sinusoidal waveform as indicated by curves Ib and Id in FIG. 13 flow respectively through the stator coils 11b and 11d.

In this connection, it is to be noted that, by adjusting the movable contact 47a of the variable resistor 47, the negative feedback with respect to the amplification circuit of the transistors Q2 and Q4 in the block A and the negative feedback with respect to the amplification circuit of the transistors Q6 and Q8 in the block B can be differentially varied. Accordingly, it is possible to eliminate the deviations in the driving currents Ia a through Id flowing through the stator coils 11a through 11d due to unevenness of the product sensitivities of the Hall elements 12 and 13.

If negative feedback is carried out by using a common resistor in negative feedback amplifiers as described above, this resistor will correspond to the emitter resistor of each transistor amplification circuit, and the amplification circuits will operate as through each circuit was a transistor amplification circuit of an emitter-grounded type having a common emitter resistor. In this case, the amplification circuit cannot operate independently of each other, and the waveform of the driving current flowing through each stator coil will depart from a sinusoidal waveform and will become, for example, a rectangular waveform.

Figure 15:
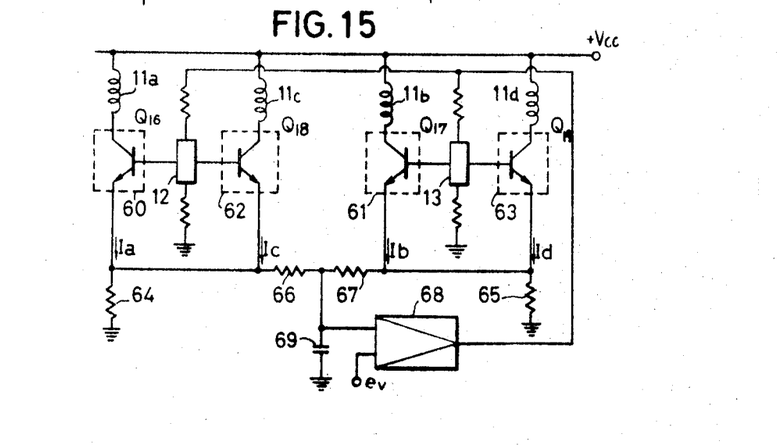
FIG. 15 is a circuit diagram indicating another embodiment of a driving circuit of a commutatorless DC motor according to the invention.

This problem can be solved in accordance with a third embodiment of the invention as described below and as illustrated by FIG. 15.

Of the currents Ia through Id controlled by amplifiers 60 through 63 including transistors Q16 through Q19 and flowing through stator coils 11a through 11d, currents Ia and Ic and currents Ib and Id not mutually overlapping become concurrent and flow through resistors 64 and 65 connected respectively between the emitters of transistors Q16 and Q18 and ground and between the emitters of transistors Q17 and Q19 and ground. Since only a driving current controlled by one of the amplifiers flows through the resistors 64 and 65, the amplifiers 60 through 63 do not interfere with each other but can operate independently. Accordingly, it is possible to pass driving currents Ia through Id of little waveform distortion controlled by the input signals of the above described amplifiers through the stator coils 11a through 11d.

Voltages produced across the terminals of the resistors 64 and 65 are led out by way of resistors 66 and 67 having resistance values which are amply higher than those of the resistors 64 and 65 and, after being smoothed by a capacitor 69, are applied to one of the input terminals of a differential amplifier 68. The output side of the amplifier 68 is connected to the current terminals of the Hall elements 12 and 13 through respective resistors. Control of the motor speed is accomplished through the control of the Hall elements 12 and 13 by the output of the amplifier 68.

Variations of the stator coil currents due to unevenness of the two Hall elements can be corrected by comparing the magnitudes of the terminal voltages of the resistors 64 and 65 by means of a suitable correction circuit (not shown).

A fourth embodiment of the direct-current motor of the present invention, which is a further improvement of the circuit shown in FIG. 10, will not be described with reference to FIG. 16. Parts shown in FIG. 16 which are the same as or equivalent to parts in FIG. 10 are designated by the same reference numerals or characters, and detailed description thereof will not be repeated.

Figure 16:
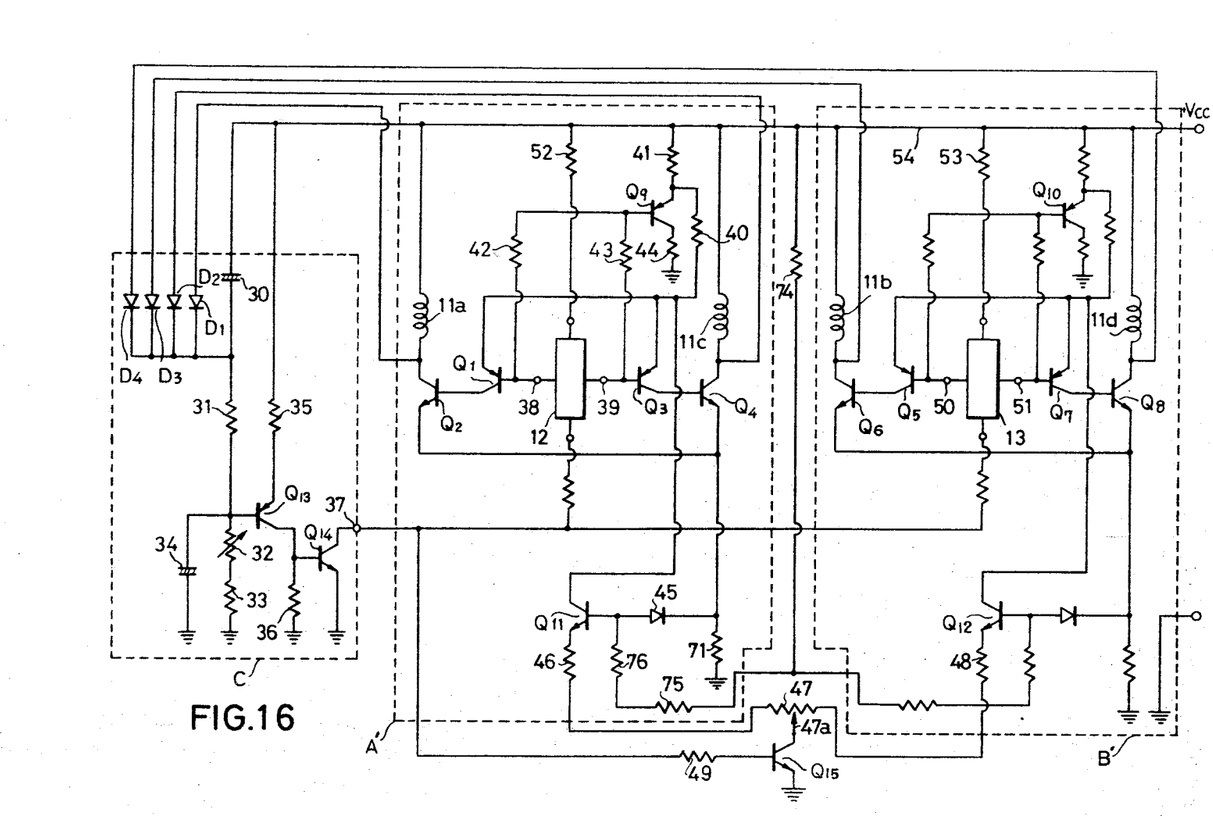
FIG. 16 is a circuit diagram showing a modification of the driving circuit shown in FIG. 10.

One difference between the circuits shown in FIGS. 16 and 10 is that, in the instant embodiment shown in FIG. 16, the junction commonly connecting the emitters of the transistors Q1 and Q3 is connected to the collector of the transistor Q11. In contrast, in the circuit shown in FIG. 10, the collectors of the transistors Q1 and Q3 are commonly connected by way of diodes 72 and 73, and this common junction is connected to the collector of the transistor Q11.

In the instant embodiment shown in FIG. 16, there is no necessity of using the diodes 70, 72, 73, etc., as used in the circuit shown in FIG. 10. Accordingly, the circuit organization becomes much simpler. Other features of the circuit organization of this fourth embodiment are the same as those of the embodiment illustrated in FIG. 10.

What I claim is:

1. A commutatorless direct current motor using Hall elements, said motor comprising:

rotor means magnetized in a manner such that the resulting distribution of the strength of magnetic flux density along the circumferential direction about the rotor axis is of sinusoidal waveform;

a stator having stator coils;

a plurality of Hall elements disposed in positions to confront said rotor;

amplifier means coupled to each one of said Hall elements and operatively responsive to the voltages derived from the voltage terminals thereof for causing passage of current through the stator windings to form a rotating magnetic field, each of said amplifier means having a negative feedback circuit;

generator means for generating a control voltage proportional to the rotational speed of said motor; and switching means responsive to the level of said control voltage when below a predetermined level for disconnecting said negative feedback circuit from said amplifier means and responsive to the level of said control voltage when above said predetermined level for connecting said negative feedback circuit to said amplifier means, whereby said amplifier means with an increased degree of amplification causes passage of a starting current of rectangular waveform through said stator coils during commencement of rotation of said rotor and said amplifier means with a decreased degree of amplification causes passage of a driving current of sinusoidal half-waveform through said stator coils when the rotation of said rotor reaches a predetermined speed.

2. A commutatorless direct current motor as defined in claim 1 wherein said switching means comprises a plurality of first transistors, each of which is connected to the corresponding negative feedback circuit, and a second transistor connected between said first transistors and ground, said control voltage being applied to the base electrode of said second transistor, said second transistor being rendered into a cutoff state in response to the level of said control voltage which is below said predetermined level to disconnect said first transistors from ground so that said first transistors become inoperative, and being rendered into a conductive state in response to the level of said control voltage which is above said predetermined level to connect said first transistors to ground so that said first transistors become operative.

3. A commutatorless direct current motor as defined in claim 1 wherein said amplifier means includes an input circuit formed in a differential amplifier having two first transistors, the base electrodes of which are respectively connected to the voltage terminals of a respective one of said Hall elements, the emitter electrodes of which are connected with each other, and a series circuit of a first resistor, a second transistor and a second resistor being connected across a power source, the base electrodes of said two first transistors being connected to the base electrode of said second transistor through a third resistor and a fourth resistor respectively, the emitter electrodes of said two first transistors being connected to the emitter electrode of said second transistor through a fifth resistor.

4. A commutatorless direct current motor as defined in claim 3 wherein said third resistor and said fourth resistor have the same resistance value.

* * * * *